(12) United States Patent
Ashibe et al.

(10) Patent No.: US 7,168,744 B2
(45) Date of Patent: Jan. 30, 2007

(54) FASTENING STRUCTURE FOR USE AT LOW TEMPERATURE

(75) Inventors: Yuuichi Ashibe, Osaka (JP); Takato Masuda, Osaka (JP); Yoshihisa Takahashi, Tokyo (JP); Shoichi Honjo, Tokyo (JP); Masato Shimodate, Tokyo (JP); Keisuke Etoh, Toyo (JP)

(73) Assignees: Sumitomo Electric Industries, Osaka (JP); Tokyo Electric Power Company, Tokyo (JP)

( * ) Notice: Subject to any disclaimer, the term of this patent is extended or adjusted under 35 U.S.C. 154(b) by 279 days.

(21) Appl. No.: 10/845,069

(22) Filed: May 14, 2004

(65) Prior Publication Data

US 2004/0256855 A1    Dec. 23, 2004

(30) Foreign Application Priority Data

Jun. 19, 2003    (JP)    ............................. 2003-174394

(51) Int. Cl.
  *F17C 1/00*    (2006.01)
  *F16B 4/00*    (2006.01)
  *F16L 41/00*    (2006.01)

(52) U.S. Cl. .................. 285/206; 285/329; 285/381.1; 285/905; 403/30; 220/560.04

(58) Field of Classification Search ............ 403/28–30, 403/408.1, 404, 337; 285/205–206, 329, 285/381.1, 422, 905; 220/560.04, 565, 601, 220/661, 693; 411/82.5

See application file for complete search history.

(56) References Cited

U.S. PATENT DOCUMENTS

| | | | | |
|---|---|---|---|---|
| 2,914,350 A | * | 11/1959 | Smith | .......................... 277/639 |
| 3,270,910 A | * | 9/1966 | Lusk | .......................... 220/327 |
| 3,489,309 A | * | 1/1970 | Patel et al. | .................. 220/586 |
| 3,790,463 A | * | 2/1974 | Gealt | .......................... 204/435 |
| 3,809,148 A | * | 5/1974 | Pulsifer | ...................... 164/418 |
| 4,138,183 A | * | 2/1979 | Soos | .......................... 439/272 |

(Continued)

FOREIGN PATENT DOCUMENTS

DE    31 25 541 A1    1/1983

(Continued)

OTHER PUBLICATIONS

Patent Abstracts of Japan, "Fastening Method of Low Thermal Expansion Coefficient Material," vol. 2002, No. 7, Jul. 2002, & JP 2002-089519, Abstract only.

*Primary Examiner*—James M. Hewitt
(74) *Attorney, Agent, or Firm*—Foley & Lardner

(57) ABSTRACT

A first flange and a second flange are superposed and fastened with a bolt and a nut in a fastening operation, to implement a fastening structure used at temperature lower than atmospheric temperature for the fastening operation. Assuming that the first flange has a thickness L1 and a coefficient of linear expansion α1, the second flange has a thickness L2 and a coefficient of linear expansion α2, superposed first flange and second flange have a thickness L, and the bolt has a coefficient of linear expansion α, a relation of $L \cdot \alpha \geq L1 \cdot \alpha1 + L2 \cdot \alpha2$ is satisfied, i.e. heat shrinkage of the bolt is not smaller than the total heat shrinkage of the first and second flanges. Thus, impairment of sealing property due to heat shrinkage is avoided at a flange junction used at low temperature.

4 Claims, 4 Drawing Sheets

U.S. PATENT DOCUMENTS

| | | | |
|---|---|---|---|
| 4,934,857 A * | 6/1990 | Swanson | 403/30 |
| 5,228,795 A | 7/1993 | Gray | |
| 5,542,254 A * | 8/1996 | Pruitt | 62/6 |
| 6,171,009 B1 | 1/2001 | Wright | |
| 6,528,012 B2 * | 3/2003 | Nishimoto et al. | 420/94 |
| 6,626,603 B2 * | 9/2003 | Gudaitis et al. | 403/30 |
| 6,668,441 B1 * | 12/2003 | Gudaitis et al. | 29/458 |
| 6,846,233 B2 * | 1/2005 | Nonogawa et al. | 451/542 |
| 6,888,060 B2 | 5/2005 | Ashibe et al. | |

FOREIGN PATENT DOCUMENTS

| | | |
|---|---|---|
| JP | 59-144317 | 8/1984 |
| JP | 11-336725 | 12/1999 |
| WO | WO 02/065605 | 8/2002 |

* cited by examiner

FASTENING STRUCTURE FOR USE AT LOW TEMPERATURE

BACKGROUND OF THE INVENTION

1. Field of the Invention

The present invention relates to a fastening structure for use at a low temperature. More particularly, the present invention improves sealing property of a fastening structure used at an atmospheric temperature lower than an atmospheric temperature at which a fastening operation is performed.

2. Description of the Background Art

Conventionally, as shown in FIG. 4A, in order to flow cooling liquid helium (LHe) through a pipe 2B provided in a superconducting wire, a pipe 2A connected to a refrigerator 3 is connected to pipe 2B via an electrically insulating joint 1 (Japanese Patent Laying-Open No. 59-144317). As shown in FIG. 4B, electrically insulating joint 1 is implemented by joining and winding an insulating body 5 composed of GFRP (glass fiber reinforced plastic) on an outer circumference of a metal pipe 4 provided at terminal ends of pipe 2A and pipe 2B at a room temperature with an adhesive. Metal pipe 4 uses a material less heat-shrinkable than GFRP, such as copper Cu, and insulating body 5 and metal pipe 4 undergo heat shrinkage in a direction fastening each other. Therefore, even when metal pipe 4 and insulating body 5 undergo heat shrinkage due to flow of cryogenic liquid helium through an internal passage of metal pipe 4, leakage of liquid helium does not take place.

Meanwhile, Japanese Patent Laying-Open No. 11-336725 proposes a joint structure used for a high-temperature pipe arrangement as shown in FIG. 5, in which a bolt 7 penetrates a pair of flanges 6, nuts 8 are screwed from opposing sides for clamping, and washers 9 having a coefficient of linear expansion larger than bolt 7 and nut 8 are interposed between flange 6 and nut 8. With such a structure, even when the flange 6 is heated to a high temperature and bolt 7 expands, washer 9 expands more than bolt 7. Therefore, lowering of a fastening torque can be prevented.

On the other hand, in electric power equipment such as terminal equipment for superconducting cable as shown in FIG. 4, assembly on site is required because of a large size of the equipment. In such a case, it is difficult to achieve a sealing junction with the adhesive, considering a time for an assembly operation or reliability in the sealing property.

In addition, though the structure shown in FIG. 5 suitably prevents loosening of flange 6 due to temperature increase, it is not effective for a case in which the temperature is lowered and flange 6, bolt 7, nut 8, and washer 9 shrink. In other words, if the structure shown in FIG. 5 is installed at a temperature lower than that at the time of fastening operation, shrinkage of washer 9 is larger than that of bolt 7 and nut 8, because washer 9 has a coefficient of linear expansion larger than that of bolt 7 and nut 8. Consequently, sealing property between nut 8 and flange 6 is impaired. Moreover, the coefficient of linear expansion of flange 6 is not considered with respect to the present structure. Therefore, if flange 6 shrink to a large extent due to lower temperature, sealing property is further impaired.

SUMMARY OF THE INVENTION

The present invention was made in view of the above-described problems. An object of the present invention is to prevent impairment of sealing property due to lowering of a fastening torque caused by heat shrinkage when a fastening structure obtained through a fastening operation in which flanges are superposed and fastened by a bolt and a nut is used at a temperature lower than an atmospheric temperature at the time of fastening.

In order to solve the problems above, initially, the present invention provides a fastening structure for use at a low temperature, obtained through a fastening operation in which a first flange and a second flange are superposed and fastened with a bolt and a nut. The fastening structure is used at a temperature lower than an atmospheric temperature at which the fastening operation is performed. Assuming that the first flange has a thickness of L1, the second flange has a thickness of L2, superposed first flange and second flange have a thickness of L, the first flange has a coefficient of linear expansion of $\alpha 1$, the second flange has a coefficient of linear expansion of $\alpha 2$, and the bolt has a coefficient of linear expansion of $\alpha$, a relation of $$L \cdot \alpha \geq L1 \cdot \alpha 1 + L2 \cdot \alpha 2$$

is satisfied. An amount of heat shrinkage of the bolt is equal to or larger than the total amount of heat shrinkage of the first flange and the second flange.

With such a structure, for example, even if the first flange and the second flange are fastened with the bolt and the nut so as to complete assembly at a room temperature and the assembly is subsequently installed in an atmosphere at a temperature lower than the room temperature, the fastening torque of the bolt is not lowered because the amount of heat shrinkage of the bolt is equal to or larger than the total amount of heat shrinkage of the first flange and the second flange. Thus, impairment of sealing property between the first and second flanges can be prevented. In addition, in designing a fastening structure used at a low temperature, a designer can select a material or a dimension of the first and second flanges and the bolt solely by determining whether or not the above equation is satisfied. Therefore, efficiency in design can significantly be improved.

Even for an example in which the first and second flanges are fastened with the bolt and the nut with a washer interposed, the above equation considering heat shrinkage solely of the first and second flanges and the bolt may suitably be used, so long as the washer has a thickness significantly smaller than that of the first flange and the second flange.

Secondly, the present invention provides a fastening structure for use at a low temperature, obtained through a fastening operation in which a first flange and a second flange are superposed and fastened with a bolt and a nut, a first washer is interposed between a head of the bolt and the first flange (or the second flange), and/or a second washer is interposed between the nut and the second flange (or the first flange). The fastening structure is used at a temperature lower than an atmospheric temperature at which the fastening operation is performed. Assuming that the first flange has a thickness of L1, the second flange has a thickness of L2, the first washer has a thickness of L3, the second washer has a thickness of L4, superposed first flange, the second flange, the first washer, and the second washer have a thickness of L, the first flange has a coefficient of linear expansion of $\alpha 1$, the second flange has a coefficient of linear expansion of $\alpha 2$, the bolt has a coefficient of linear expansion of $\alpha$, the first washer has a coefficient of linear expansion of $\alpha 3$, and the second washer has a coefficient of linear expansion of $\alpha 4$, a relation of $$L \cdot \alpha \geq L1 \cdot \alpha 1 + L2 \cdot \alpha 2 + L3 \cdot \alpha 3 + L4 \cdot \alpha 4$$

is satisfied. An amount of heat shrinkage of the bolt is equal to or larger than the total amount of heat shrinkage of the first flange, the second flange, the first washer, and the second washer.

With the structure described above, even if the first flange and the second flanges are fastened with the bolt and the nut with the first washer and/or the second washer interposed so as to complete assembly and the assembly is subsequently installed in an atmosphere at a low temperature, the fastening torque of the bolt is not lowered because the amount of heat shrinkage of the bolt is equal to or larger than the total amount of heat shrinkage of the first and second flanges and the first and second washers. Thus, impairment of sealing property between the first and second flanges can be prevented. In addition, in designing a fastening structure used at a low temperature as described above, a designer can select a material or a dimension of the first and second flanges, the first and second washers, and the bolt solely by determining whether or not the above equation is satisfied. Therefore, efficiency in design can significantly be improved.

The second flange is a part of a container containing a cryogenic coolant inside. The container is sealed by fastening the first flange to the second flange with the bolt.

For example, the temperature outside the container is set to a room temperature, while the container is filled with a cryogenic coolant (such as liquid nitrogen and liquid helium) at approximately −200° C., for example. Then, a temperature difference between the time of fastening operation of the first and second flanges and the time of installation is very large. Accordingly, as described above, a fastening structure is designed such that lowering of the fastening torque of the bolt is prevented, considering a temperature at the time of installation lower than that at the fastening operation. In this manner, leakage of coolant in the container from a fastening portion can reliably be prevented.

As to a specific example of a material for each component, preferably, the first flange is composed of GFRP, stainless steel or epoxy resin; the second flange is composed of stainless steel or GFRP; the bolt is composed of stainless steel or aluminum; and the first washer and the second washer are composed of stainless steel or aluminum.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A first embodiment of the present invention will be described with reference to the figures.

Figure 1:
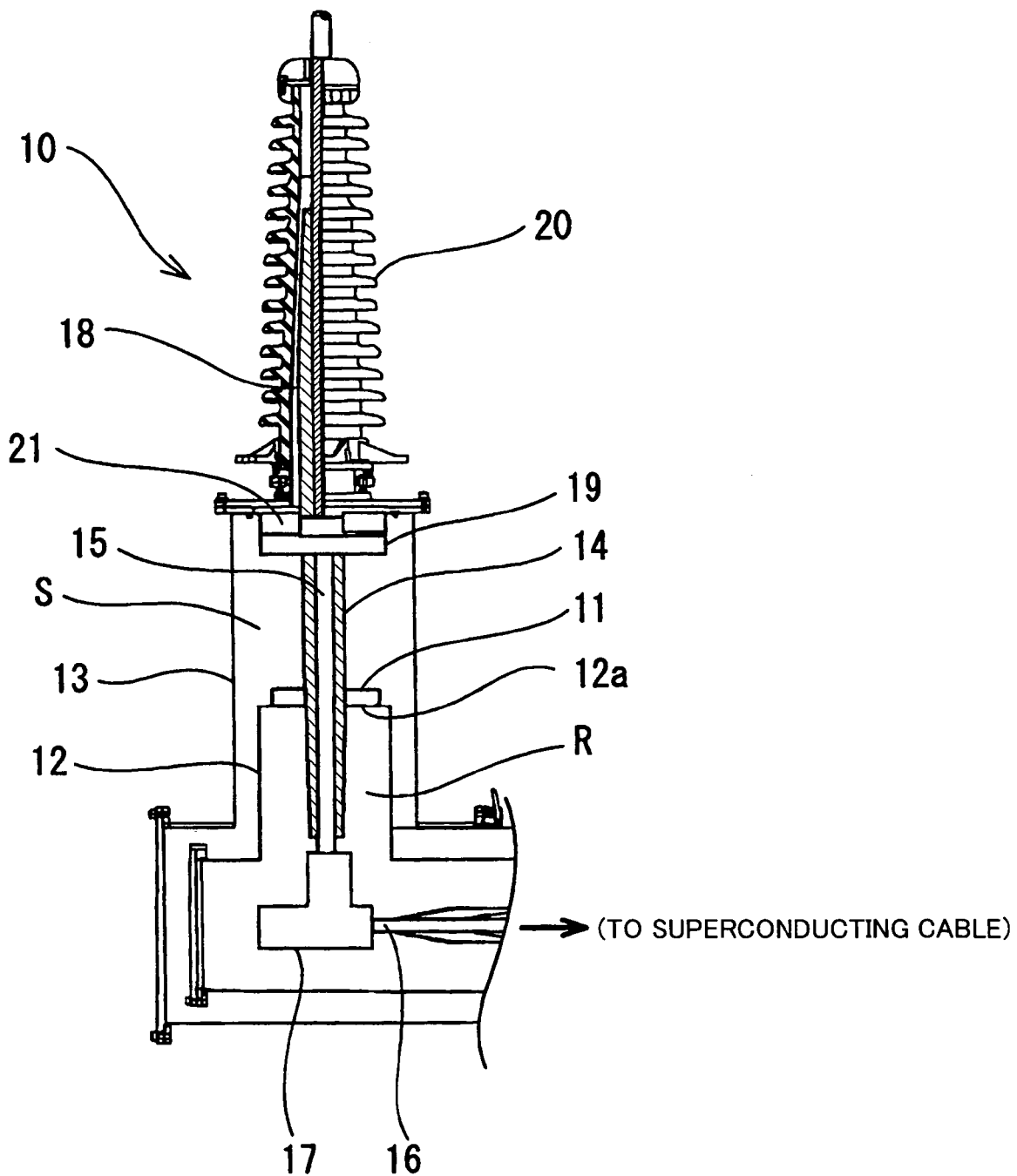
FIG. 1 is a schematic diagram illustrating a termination connector where a fastening structure for use at a low temperature in an embodiment of the present invention is employed.

FIG. 1 shows a termination connector 10 to which a superconducting cable (not shown) is connected.

Termination connector 10 connects a conductor 16 connected to the superconducting cable to a current lead 15 implemented by a copper pipe via a lower shield portion 17 in a container 12 made of stainless steel in which a coolant R is sealed.

Current lead 15 is drawn out from an upper surface of container 12 while it is inserted into a cylindrical bushing 14 formed by layering GFRP and a foil electrode around an outer circumference of a stainless pipe. Then, current lead 15 is drawn out from an upper end of a fourth flange 21 described later to the outside.

An outer container 13 defining a space serving as a vacuum portion S is provided outside container 12. A room temperature portion is implemented by fixing a pipe insulator 20 above outer container 13. Insulating oil 18 is present between pipe insulator 20 and bushing 14 inserted therein.

A first flange 11 made of GFRP is screwed and attached to bushing 14 in a lower portion on the outer circumference of bushing 14, whereby first flange 11 and bushing 14 are integrated. Coolant R is sealed by fastening and fixing first flange 11 to a second flange 12a at an upper end of container 12.

In addition, a third flange 19 made of stainless steel is screwed and attached to bushing 14 also at an upper portion on the outer circumference of bushing 14, whereby third flange 19 and bushing 14 are integrated. An upper end of outer container 13 forming vacuum portion S is sealed by fastening and fixing third flange 19 to fourth flange 21 on an upper end surface of outer container 13.

In the following, a fastening structure of first flange 11 and second flange 12a will be described in detail.

Figure 2:
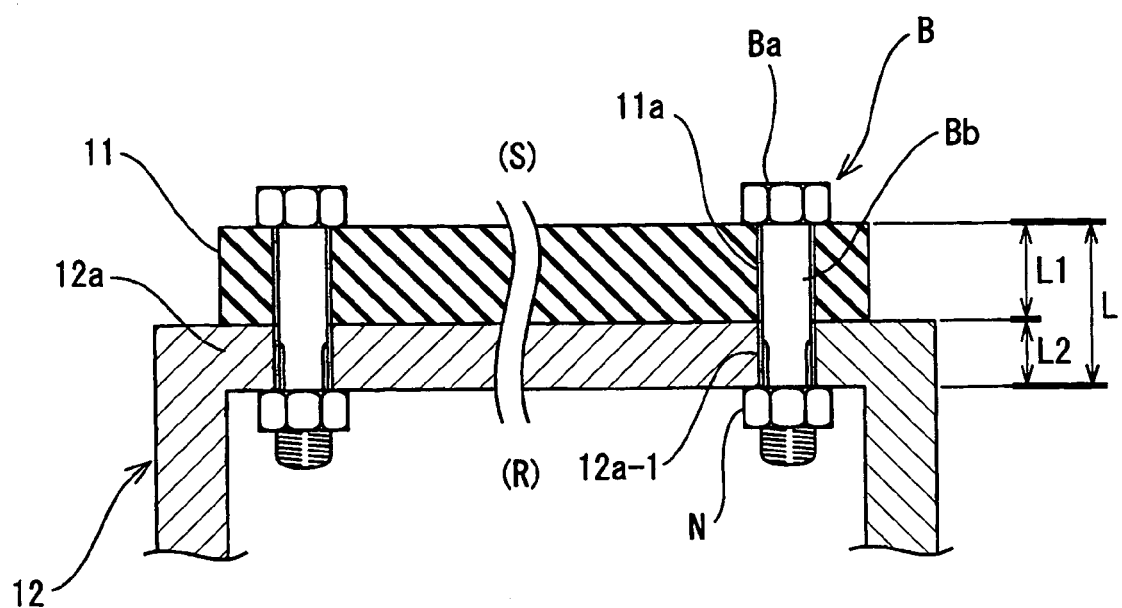
FIG. 2 is an enlarged cross-sectional view of the fastening structure for use at a low temperature in a first embodiment.

As shown in FIG. 2, second flange 12a serving as the upper surface of container 12 made of stainless steel has a thickness L2, and has a bolt insertion hole 12a-1 provided at a prescribed position.

First flange 11 made of GFRP has a thickness L1, and has a bolt insertion hole 11a provided at a position corresponding to bolt insertion hole 12a-1 in second flange 12a. It is to be noted that a total thickness of superposed first flange 11 and second flange 12a is assumed as L.

(Bushing 14 is not illustrated in FIG. 2.)

First flange 11 is fastened to second flange 12a at a room temperature (t1) using bolt B made of stainless steel and a nut N. Specifically, bolt insertion holes 11a and 12a-1 of first flange 11 and second flange 12a are aligned. Then, a shaft Bb of bolt B penetrates bolt insertion holes 11a and 12a-1, and a head Ba abuts on the upper surface of first flange 11. Thereafter, nut N is fastened to shaft Bb projecting downward from second flange 12a.

Here, a material and a dimension for first flange 11, second flange 12a and bolt B are selected in order to satisfy a relation of:

(amount of heat shrinkage of bolt B)≧(amount of heat shrinkage of first flange 11)+(amount of heat shrinkage of second flange 12a), so that sealing property between first flange 11 and second flange 12a is not impaired when the fastening portion is cooled from room temperature t1 at the time of fastening operation to a temperature t2 of coolant R, to shrink first flange 11, second flange 12a and bolt B.

In other words, if the amount of heat shrinkage of bolt B is not smaller than the total amount of heat shrinkage of first flange 11 and second flange 12a, the fastening torque of bolt B is maintained or further increased. Accordingly, prevention of impairment of sealing property can be ensured.

More specifically, assuming that first flange 11 made of GFRP has a coefficient of linear expansion of $\alpha 1$, second flange 12a made of stainless steel has a coefficient of linear expansion of $\alpha 2$, and the bolt B made of stainless steel has a coefficient of linear expansion of $\alpha$, a material and a dimension are selected for design, so as to satisfy a relation of $$L \cdot \alpha(t1-t2) \geq L1 \cdot \alpha 1(t1-t2) + L2 \cdot \alpha 2(t1-t2),$$
$$\therefore L \cdot \alpha \geq L1 \cdot \alpha 1 + L2 \cdot \alpha 2 \qquad \text{Equation (1).}$$

The present embodiment is designed so as to satisfy Equation (1), assuming that room temperature t1 is set to 20[° C.], temperature t2 of coolant R is set to −200[° C.], first flange 11 (made of GFRP) has $\alpha 1 = 2.4 \times 10^{-5}[1/°\ \text{C.}]$ and L1=40[mm], second flange 12a (made of stainless steel) has $\alpha 2 = 1.1 \times 10^{-5}[1/°\ \text{C.}]$ and L2=20[mm], and bolt B (made of stainless steel) has $\alpha = 1.1 \times 10^{-5}[1/°\ \text{C.}]$.

Note that first flange 11 may be composed of stainless steel, epoxy resin or the like instead of GFRP; second flange 12a may be composed of GFRP or the like instead of stainless steel; and bolt B may be composed of aluminum or the like instead of stainless steel.

A second embodiment of the present invention will now be described with reference to the figures.

Figure 3:
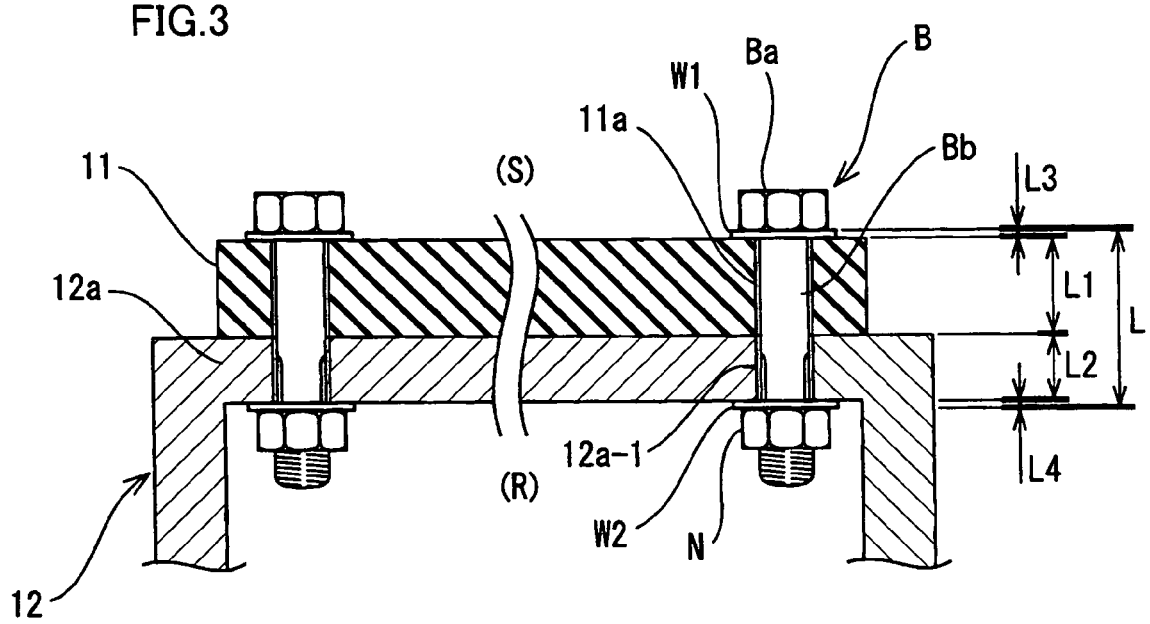
FIG. 3 is an enlarged cross-sectional view of the fastening structure for use at a low temperature in a second embodiment.
Figure 4A:
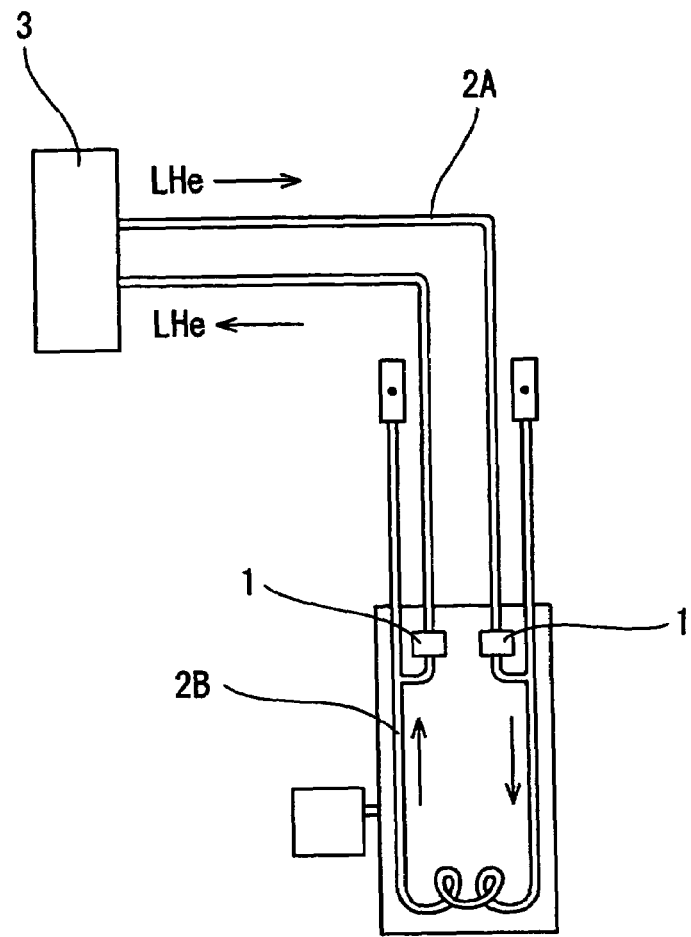
FIGS. 4A and 4B illustrate a conventional example disclosed in Japanese Patent Laying-Open No. 59-144317.
Figure 4B:
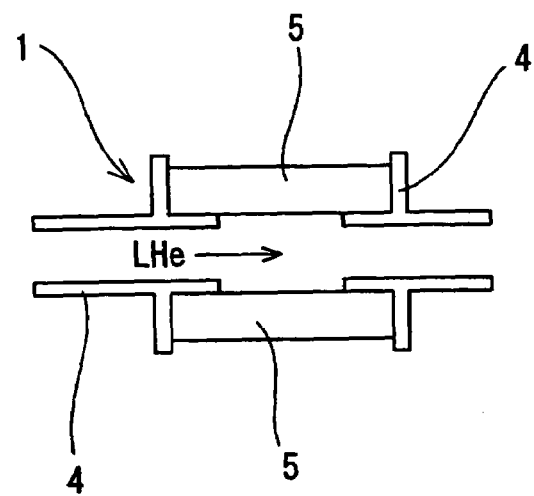
Figure 5:
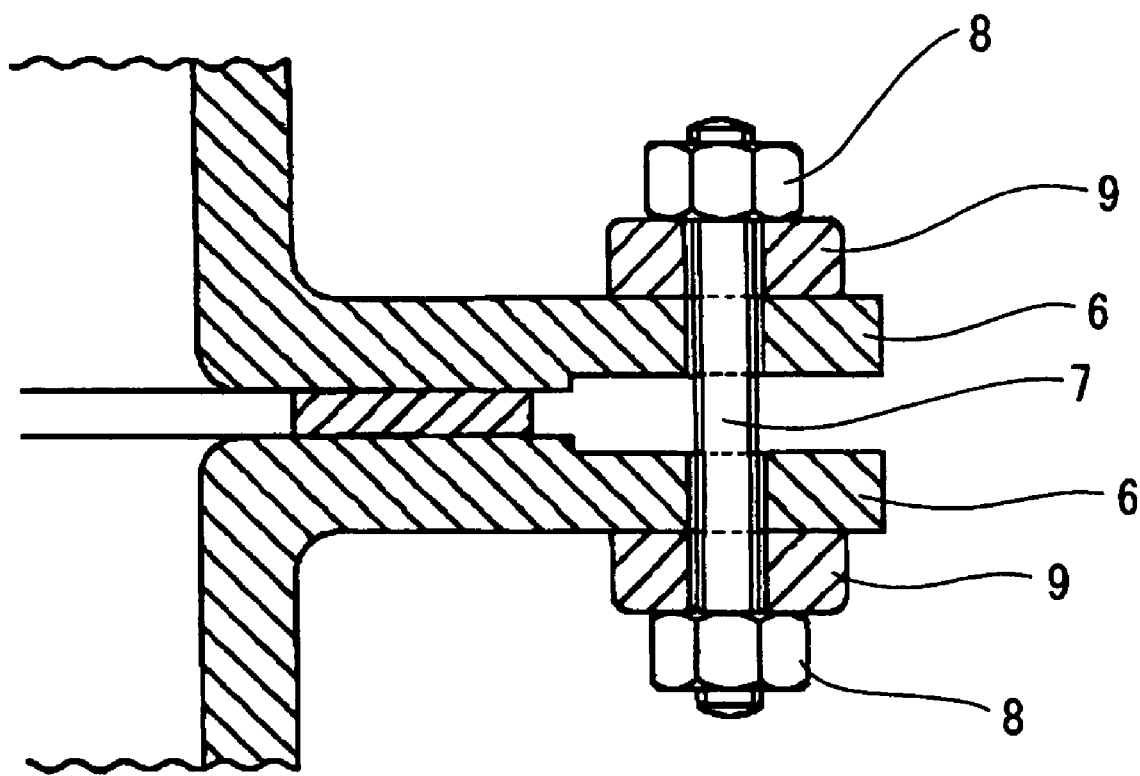
FIG. 5 illustrates a conventional example disclosed in Japanese Patent Laying-Open No. 11-336725.

Referring to FIG. 3, the second embodiment is different from the first embodiment in that a first washer W1 and a second washer W2 are interposed when first flange 11 and second flange 12a are fastened with bolt B and nut N.

In other words, in fastening, first washer W1 is interposed between head Ba of bolt B and first flange 11, and second washer W2 is interposed between nut N and second flange 12a.

Here, a material and a dimension for first flange 11, second flange 12a, bolt B, first washer W1, and second washer W2 are selected, in order to satisfy a relation of:

(amount of heat shrinkage of bolt B)≧(amount of heat shrinkage of first flange 11)+(amount of heat shrinkage of second flange 12a)+(amount of heat shrinkage of first washer W1)+(amount of heat shrinkage of second washer W2), so that sealing property between first flange 11 and second flange 12a is not impaired when the fastening portion is cooled from temperature t1 at the time of fastening operation to temperature t2 of coolant R, to shrink first flange 11, second flange 12a, bolt B, first washer W1, and second washer W2.

In other words, if the amount of heat shrinkage of bolt B is not smaller than the total amount of heat shrinkage of first flange 11, second flange 12a, first washer W1, and second washer W2, the fastening torque of bolt B is maintained or further increased. Accordingly, prevention of impairment of sealing property can be ensured.

More specifically, assuming that first flange 11 made of GFRP has a thickness of L1 and a coefficient of linear expansion of $\alpha 1$, second flange 12a made of stainless steel has a thickness of L2 and a coefficient of linear expansion of $\alpha 2$, bolt B made of stainless steel has a coefficient of linear expansion of $\alpha$, first washer W1 made of stainless steel has a thickness of L3 and a coefficient of linear expansion of $\alpha 3$, second washer W2 made of stainless steel has a thickness of L4 and a coefficient of linear expansion of $\alpha 4$, and the total thickness of first flange 11, second flange 12a, first washer W1, and second washer W2 is denoted by L, a material and a dimension are selected for design, so as to satisfy a relation of:

$$L \cdot \alpha(t1-t2) \geq L1 \cdot \alpha 1(t1-t2) + L2 \cdot \alpha 2(t1-t2) + L3 \cdot \alpha 3(t1-t2) + L4 \cdot \alpha 4(t1-t2), \therefore L \cdot \alpha \geq L1 \cdot \alpha 1 + L2 \cdot \alpha 2 + L3 \cdot \alpha 3 + L4 \cdot \alpha 4 \qquad \text{Equation (2).}$$

Note that first washer W1 and second washer W2 may be composed of aluminum or the like instead of stainless steel. In addition, first washer W1 and second washer W2 may be identical.

Moreover, either first washer W1 or second washer W2 may be used. If solely first washer W1 is used, L4 is set to 0 in Equation (2) and calculation is performed to satisfy a relation of $L \cdot \alpha \geq L1 \cdot \alpha 1 + L2 \cdot \alpha 2 + L3 \cdot \alpha 3$.

The second embodiment is otherwise configured in a manner the same as in the first embodiment, and description will not be repeated.

A variation of the second embodiment is possible. If first washer W1 and second washer W2 have a thickness considerably smaller than that of first flange 11 and second flange 12a, heat shrinkage solely of first flange 11, second flange 12a and bolt B may be taken into account.

In other words, if L3, L4<<L1, L2, L3=L4 is approximated to 0 in Equation (2) above. Then, a material and a dimension may suitably be selected for design, so as to satisfy a relation of:

$$L \cdot \alpha \geq L1 \cdot \alpha 1 + L2 \cdot \alpha 2 + L3,$$

which is similar to Equation (1) in the first embodiment.

As can clearly be seen from the description above, according to the present invention, the first flange and the second flange are fastened with the bolt and the nut so as to complete assembly. Even if the assembly is installed in an atmosphere at a low temperature, the fastening torque of the bolt is not lowered because the amount of heat shrinkage of the bolt is set to be equal to or larger than the total amount of heat shrinkage of the first flange and the second flange. Thus, impairment of sealing property between the first and second flanges can be prevented.

In addition, if the first flange and the second flange are fastened with the bolt and the nut with the first washer and/or the second washer interposed, the amount of heat shrinkage of the bolt is set to be equal to or larger than the total amount of heat shrinkage of the first and second flanges and the first and second washers. In this manner, the fastening torque of the bolt is not lowered, and impairment of sealing property between the first and second flanges can be prevented.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A fastening structure for use at a low temperature comprising:
   a first flange;
   a second flange superposed on said first flange; and
   a bolt fastening said first flange and said second flange with a nut; wherein
   said fastening structure is used at a temperature lower than an atmospheric temperature at which a fastening operation is performed, a relation of $$L \cdot \alpha \geq L1 \cdot \alpha1 + L2 \cdot \alpha2$$

is satisfied, where L1 represents a thickness of said first flange, L2 represents a thickness of said second flange, L represents a thickness of superposed said first flange and said second flange, α1 represents a coefficient of linear expansion of said first flange, α2 represents a coefficient of linear expansion of said second flange, and α represents a coefficient of linear expansion of said bolt, and an amount of heat shrinkage of said bolt is equal to or larger than a total amount of heat shrinkage of said first flange and said second flange, and wherein said second flange is a part of a container storing a cryogenic coolant inside, and said container is sealed by fastening said first flange to said second flange with said bolt, and an outer container defining a vacuum portion is provided outside said container.

2. The fastening structure for use at a low temperature according to claim 1, wherein said first flange is composed of glass fiber reinforced plastic, stainless steel or epoxy resin, said second flange is composed of stainless steel or glass fiber reinforced plastic, and said bolt is composed of stainless steel or aluminum.

3. A fastening structure for use at a low temperature comprising:

a first flange;

a second flange superposed on said first flange;

a bolt fastening said first flange and said second flange with a nut;

(1) a first arrangement in which a first washer is interposed between a head of said bolt and said first flange and/or a second washer interposed between said nut and said second flange or (2) a second arrangement in which a first washer is interposed between a head of said bolt and said second flange and/or a second washer is interposed between said nut of said bolt and said first flange;

wherein said fastening structure is used at a temperature lower than an atmospheric temperature at which said fastening operation is performed, a relation of $$L \cdot \alpha \geq L1 \cdot \alpha1 + L2 \cdot \alpha2 + L3 \cdot \alpha3 + L4 \cdot \alpha4$$

is satisfied, where L1 represents a thickness of said first flange, L2 represents a thickness of said second flange, L3 represents a thickness of said first washer, L4 represents a thickness of said second washer, L represents a thickness of superposed said first flange, said second flange, said first washer, and said second washer, α1 represents a coefficient of linear expansion of said first flange, α2 represents a coefficient of linear expansion of said second flange, α represents a coefficient of linear expansion of said bolt, α3 represents a coefficient of linear expansion of said first washer, and α4 represents a coefficient of linear expansion of said second washer, and an amount of heat shrinkage of said bolt is equal to or larger than a total amount of heat shrinkage of said first flange, said second flange, said first washer, and said second washer, and wherein said second flange is a part of a container storing a cryogenic coolant inside, and said container is sealed by fastening said first flange to said second flange with said bolt, and an outer container defining a vacuum portion is provided outside said container.

4. The fastening structure for use at a low temperature according to claim 3, wherein said first flange is composed of glass fiber reinforced plastic, stainless steel or epoxy resin, said second flange is composed of stainless steel or glass fiber reinforced plastic, said bolt is composed of stainless steel or aluminum, and said first washer is composed of stainless steel or aluminum, and said second washer is composed of stainless steel or aluminum.

* * * * *